United States Patent
Yamamoto et al.

(10) Patent No.: US 10,189,431 B2
(45) Date of Patent: Jan. 29, 2019

(54) VEHICLE OCCUPANT PROTECTION DEVICE

(71) Applicant: TOYOTA JIDOSHA KABUSHIKI KAISHA, Toyota-shi, Aichi-ken (JP)

(72) Inventors: Seiji Yamamoto, Seto (JP); Masanobu Ohmi, Kasugai (JP); Yoshiaki Matsumura, Toyota (JP); Kosuke Sakakibara, Toyota (JP); Kazuki Sugie, Miyoshi (JP); Misato Kinoshita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/467,760

(22) Filed: Mar. 23, 2017

(65) Prior Publication Data

US 2017/0291565 A1 Oct. 12, 2017

(30) Foreign Application Priority Data

Apr. 8, 2016 (JP) .................................. 2016-078419

(51) Int. Cl.
*B60R 21/207* (2006.01)
*B60R 21/233* (2006.01)
(Continued)

(52) U.S. Cl.
CPC .......... *B60R 21/207* (2013.01); *B60R 21/233* (2013.01); *B60R 21/235* (2013.01);
(Continued)

(58) Field of Classification Search
CPC .......... B60R 21/207; B60R 2021/2074; B60R 2021/23146
See application file for complete search history.

(56) References Cited

U.S. PATENT DOCUMENTS 3,953,049 A * 4/1976 Surace ................... B60R 21/08
280/730.1
4,440,443 A * 4/1984 Nordskog ................ A47C 7/38
297/217.4
(Continued)

FOREIGN PATENT DOCUMENTS

FR 2927592 A1 8/2009
JP 2000-344044 A 12/2000
(Continued)

OTHER PUBLICATIONS

Translation of JP2007230396A, Sugimoto, et al. Sep. 13, 2007.*
Nov. 13, 2018 Office Action issued in Japanese Patent Application No. 2016-078419.

*Primary Examiner* — Faye M Fleming
(74) *Attorney, Agent, or Firm* — Oliff PLC

(57) ABSTRACT

A vehicle occupant protection device includes: an airbag structured as a single bag that is configured to cover a head area of a vehicle occupant, the airbag being stowed at a headrest or seatback of a vehicle seat, the airbag receiving a gas supply and inflating and expanding toward a seat front side, and the airbag including a front inflation portion that is configured to be inflated at the seat front relative to the head area and a left and right pair of side inflation portions that are connected to the front inflation portion and configured to be inflated at seat sides relative to the head area; and an opening portion that is provided at the airbag, is configured to cover the head area from the seat front side or a seat side, and is openable after the inflation and expansion of the airbag.

4 Claims, 8 Drawing Sheets

(51) Int. Cl.
  *B60R 21/235* (2006.01)
  *B60R 21/237* (2006.01)
  *B60R 21/231* (2011.01)
  *B60R 21/2334* (2011.01)

(52) U.S. Cl.
  CPC ........ *B60R 21/237* (2013.01); *B60R 21/2334* (2013.01); *B60R 21/23138* (2013.01); *B60R 2021/2074* (2013.01); *B60R 2021/23146* (2013.01); *B60R 2021/23509* (2013.01); *B60R 2021/23576* (2013.01)

(56) References Cited

U.S. PATENT DOCUMENTS

| | | | | |
|---|---|---|---|---|
| 6,039,343 | A * | 3/2000 | Scherer | B60R 21/21658 200/61.54 |
| 6,315,245 | B1 * | 11/2001 | Ruff | B64D 25/02 244/122 AG |
| 6,572,137 | B2 * | 6/2003 | Bossecker | B60R 21/207 280/730.1 |
| 7,040,651 | B2 * | 5/2006 | Bossecker | B60R 21/23138 280/729 |
| 7,150,468 | B2 * | 12/2006 | Pan | B60R 21/207 280/730.1 |
| 8,485,551 | B2 * | 7/2013 | Dainese | B60R 21/207 280/730.1 |
| 8,807,593 | B2 * | 8/2014 | Lee | B60R 21/233 280/730.1 |
| 9,573,553 | B2 * | 2/2017 | Ko | B60R 21/233 |
| 10,077,058 | B2 * | 9/2018 | Ohmi | B60R 21/23138 |
| 10,099,643 | B2 * | 10/2018 | Sakakibara | B60N 2/68 |
| 2008/0246264 | A1 * | 10/2008 | Gerfast | B60N 2/4221 280/801.1 |
| 2013/0015642 | A1 | 1/2013 | Islam et al. | |
| 2014/0327234 | A1 * | 11/2014 | Heurlin | B60R 21/207 280/730.1 |
| 2016/0347272 | A1 * | 12/2016 | Kato | B60R 21/207 |
| 2017/0174170 | A1 * | 6/2017 | Aranzulla | B60R 21/231 |
| 2017/0282834 | A1 * | 10/2017 | Sugie | B60R 21/01512 |
| 2017/0291564 | A1 * | 10/2017 | Ohmi | B60R 21/237 |
| 2018/0236962 | A1 * | 8/2018 | Ohno | B60R 21/207 |

FOREIGN PATENT DOCUMENTS

| | | |
|---|---|---|
| JP | 2007-230396 A | 9/2007 |
| JP | 2013-018378 A | 1/2013 |
| WO | 2016/174785 A1 | 11/2016 |

* cited by examiner

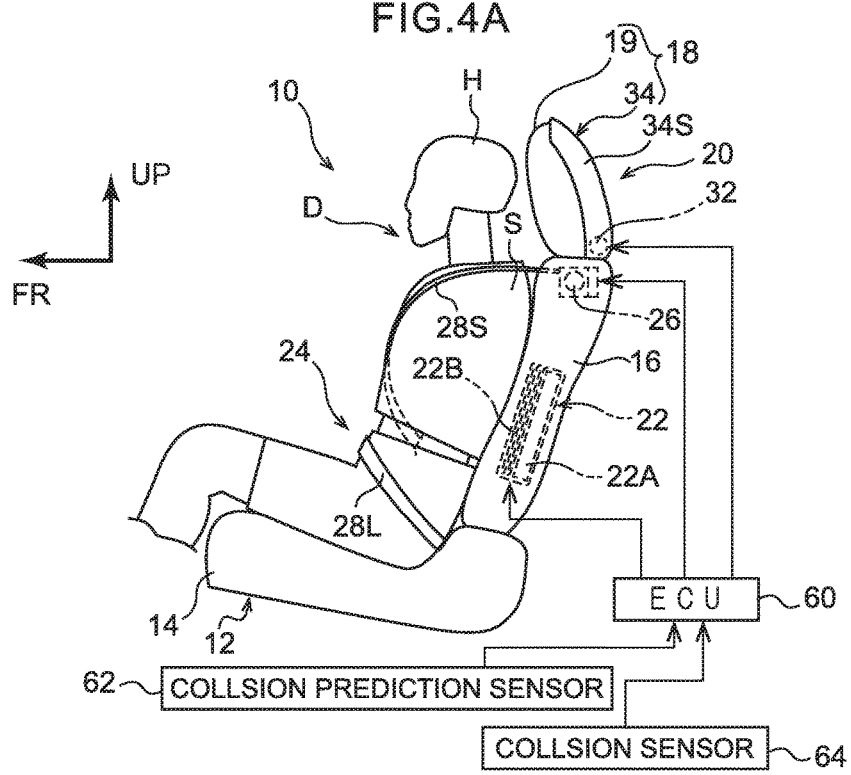
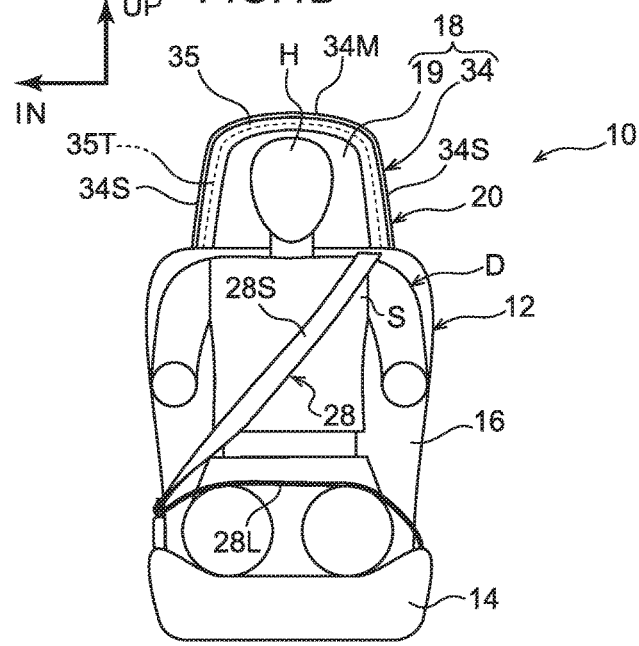

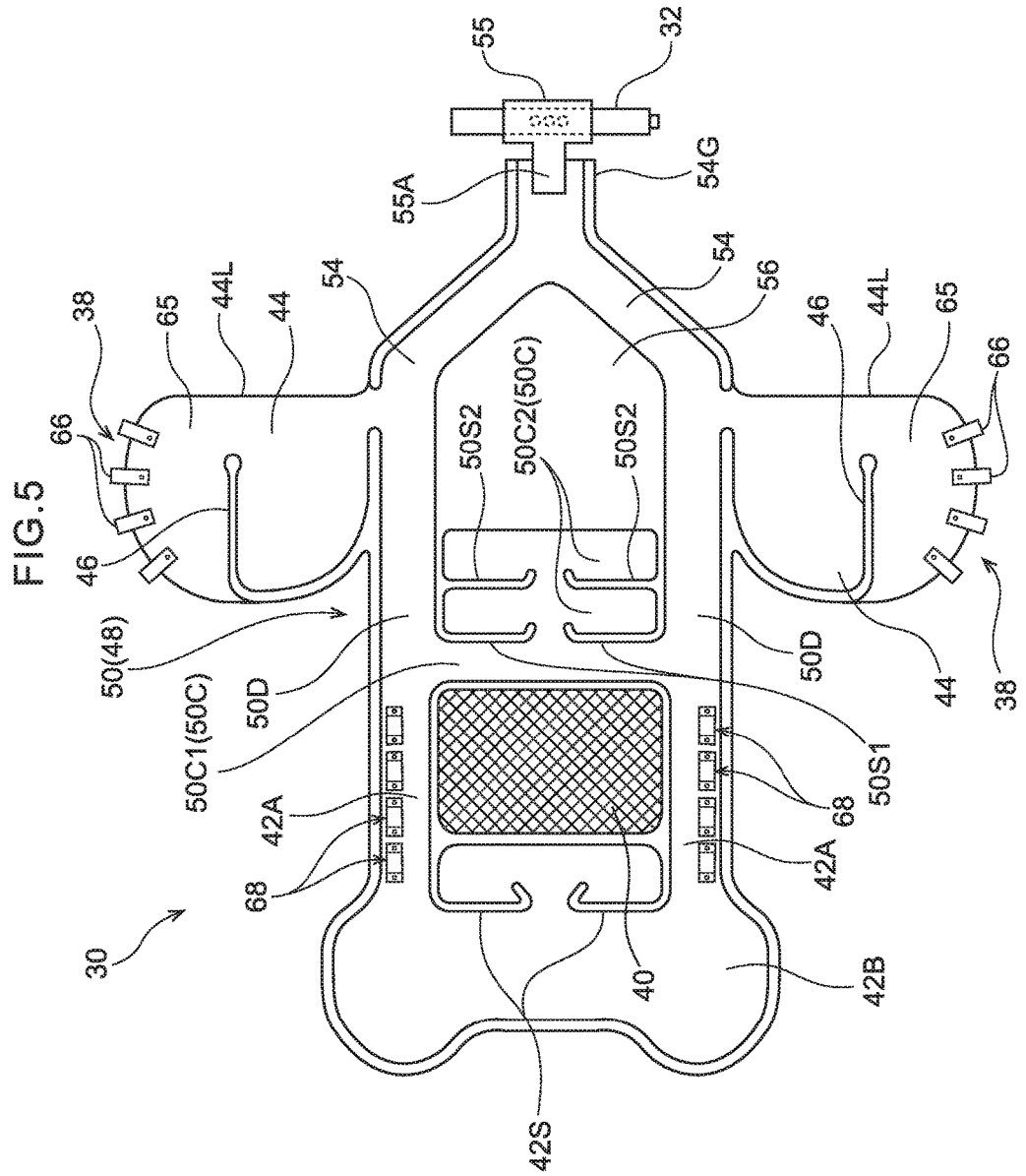

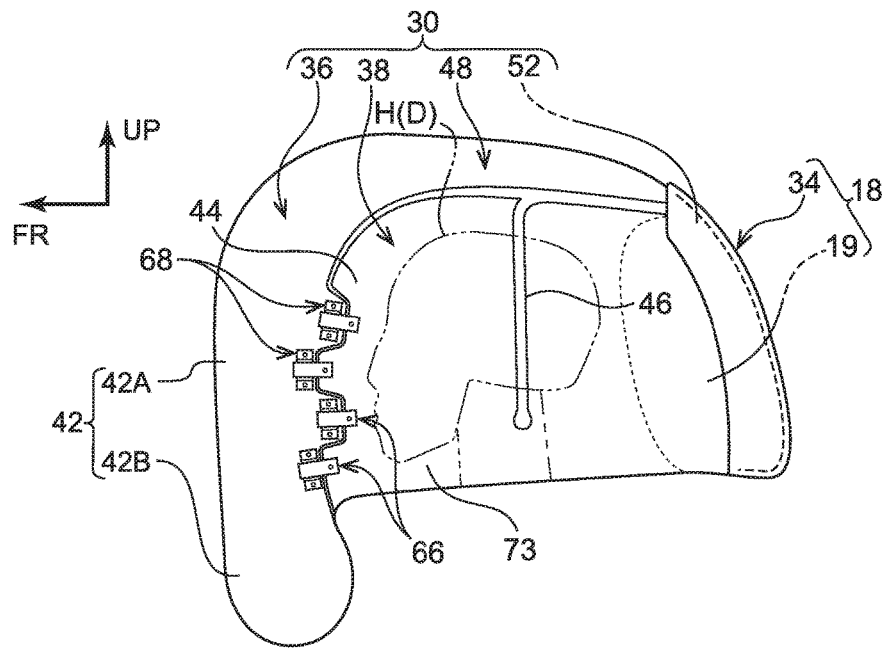
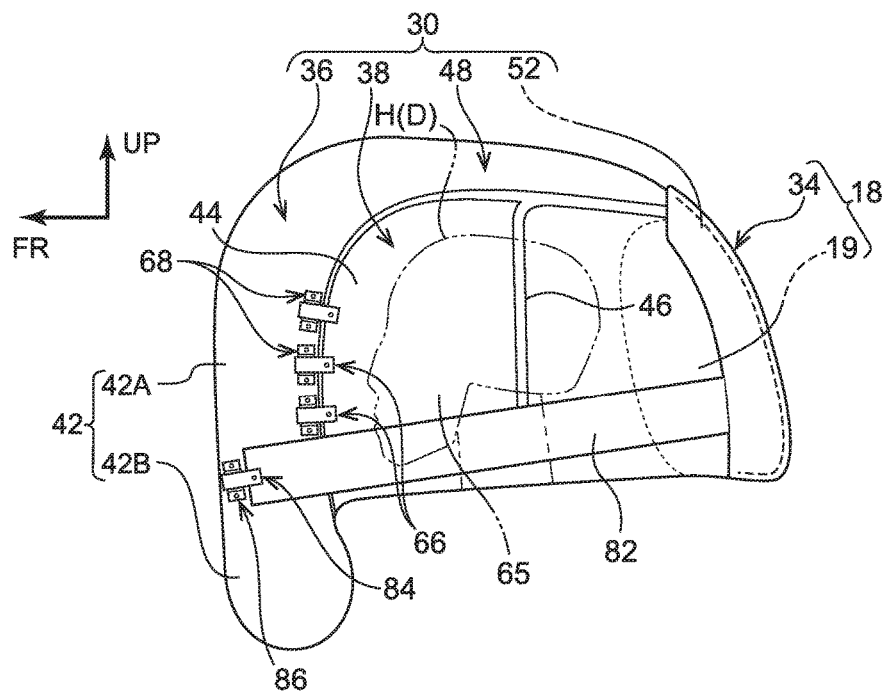

VEHICLE OCCUPANT PROTECTION DEVICE

CROSS-REFERENCE TO RELATED APPLICATION

This application is based on and claims priority under 35 USC 119 from Japanese Patent Application No. 2016-078419 filed on Apr. 8, 2016, the disclosure of which is incorporated by reference herein.

BACKGROUND

Technical Field

The present invention relates to a vehicle occupant protection device.

Related Art

Japanese Patent Application Laid-Open (JP-A) No. 2000-344044 discloses an airbag device in which, at a time of collision, gas from an inflator is supplied through a gas supply pipe fixed to a seatback into a bag attached to the gas supply pipe and inflates the bag so as to cover the front and sides of a vehicle occupant. JP-A No. 2013-018378 discloses an airbag device in which airbags inflate forward from left and right end portions of a headrest of a seat and join together at the front face of the head area of a vehicle occupant, while an auxiliary airbag inflates forward from a central portion of the headrest and joins together with the pair of airbags. United States Patent Publication No. 2013/0015642 discloses a structure in which a hood is stowed inside a cover provided at an upper portion of a seatback, which hood receives a supply of gas from an inflator and expands so as to cover the upper body of a vehicle occupant.

In the structure according to JP-A No. 2000-344044, the gas supply pipe is provided above the seatback and, therefore, appearance is poor. Similarly, in the structure according to US 2013/0015642, the inflator and the cover are exposed and appearance is poor. Meanwhile, in the structure according to JP-A No. 2013-018378, it is difficult to assure a joining strength between the pair of head airbags that are joined to one another after the inflation and expansion and a joining strength between the auxiliary head airbag and the pair of head airbags.

In response, employing a structure in which an airbag is stowed in a headrest, seatback or the like of a vehicle seat, the airbag is inflated and expanded to the seat front side, and the airbag covers the head of a vehicle occupant from the front and both left and right sides has been considered. In this state, because the head of the vehicle occupant is covered from all around by the airbag, it is troublesome for the vehicle occupant to get off the vehicle seat or for the vehicle occupant to be taken off the vehicle seat. Thus, there is scope for improvement.

SUMMARY

In consideration of the circumstances described above, the present disclosure provides a vehicle occupant protection device that, in a structure in which an airbag is stowed in a headrest or seatback, may assure ease of dismounting of a vehicle occupant even after inflation and expansion of the airbag.

An aspect of the present disclosure is a vehicle occupant protection device including: an airbag structured as a single bag that is configured to cover a head area of a vehicle occupant, the airbag being stowed at a headrest or seatback of a vehicle seat, the airbag receiving a gas supply and inflating and expanding toward a seat front side, and the airbag including a front inflation portion that is configured to be inflated at the seat front relative to the head area and a left and right pair of side inflation portions that are connected to the front inflation portion and configured to be inflated at seat sides relative to the head area; and an opening portion that is provided at the airbag, is configured to cover the head area from the seat front side or a seat side, and is openable after the inflation and expansion of the airbag.

In the present aspect, the airbag is stowed in a headrest or seatback of a vehicle seat. The airbag receives a supply of gas and inflates and expands to the seat front side from the headrest or seatback. The airbag is structured as the single bag that includes the front inflation portion and the pair of left and right side inflation portions and that covers the head of the vehicle occupant. Therefore, in various collision modes, movements of the head of the vehicle occupant are restricted (the head of the vehicle occupant is restrained) by the airbag and the vehicle occupant is protected.

The opening portion that is openable after the inflation and expansion of the airbag is provided in the airbag. The head of the vehicle occupant is covered from the seat front or seat side by the opening portion. Thus, for example, after a collision of the vehicle has been predicted or detected and the airbag has been inflated and expanded, the opening portion may be opened and the head of the vehicle occupant may be easily moved out of the airbag when the vehicle occupant is getting off the vehicle seat or the vehicle occupant is being taken off the vehicle seat.

Thus, according to the present aspect, in the structure in which the airbag is stowed in the headrest or seatback, ease of dismounting of a vehicle occupant after inflation and expansion of the airbag may be assured.

In the above aspect, the opening portion may include plural opening hooks at a periphery edge portion thereof, and the airbag may include opening engaging portions with which the plural opening hooks are respectively detachably engaged.

In the structure described above, the opening portion may be opened simply by removing the opening hooks from the opening engaging portions. When a rescuer is taking a vehicle occupant off the vehicle seat, the rescuer may understand at a glance how to open the opening portion from the airbag. Therefore, the rescuer may open the opening portion without needing particular knowledge.

Thus, according to the structure described above, the ease of dismounting of a vehicle occupant may be assured with a simple structure.

In the above aspect, the airbag may be stowed in the headrest or the seatback together with the opening portion in a folded state, and the plural opening hooks may be disposed to be staggered such that neighboring the opening hooks do not overlap in the state in which the opening portion is folded.

In the structure described above, opening hooks that are adjacent to one another do not overlap in the state in which the opening portion is folded. Therefore, the airbag may be stowed compactly. Moreover, during inflation and expansion of the opening portion, an occurrence of the opening hooks interfering with one another and impeding expansion may be suppressed.

Thus, according to the structure described above, the airbag may be stowed compactly and expansion performance of the opening portion may be made reliable.

In the above aspect, each of the plural opening hooks may include a grippable strap.

In the structure described above, because the strap is attached, each opening hook may be more easily removed from the opening engaging portion than in a structure in which the opening hook itself is gripped and removed from the opening engaging portion.

Thus, according to the structure described above, efficiency when opening the opening portion may be improved.

The above aspect may further include a connecting cloth that extends in a seat front-rear direction and connects up the airbag in the seat front-rear direction in the inflated and expanded state, the connecting cloth may include a connection release hook at at least one of one end portion and another end portion of the connecting cloth, wherein the airbag may include a connection release engaging portion with which the connection release hook detachably engages.

In the structure described above, because the airbag is connected up in the seat front-rear direction by the connecting cloth, spreading of the airbag in the seat front-rear direction during the inflation and expansion is suppressed and an expanded attitude may be excellently maintained. The connection state by the connecting cloth may be released by removing the joining release hook from the joining release engaging portion. Therefore, the opening portion may be opened more easily than in a structure in which the connecting cloth is non-detachably connected.

Thus, according to the structure described above, both the expanded attitude of the airbag may be excellently maintained and the ease of dismounting of a vehicle occupant may be assured.

BRIEF DESCRIPTION OF THE DRAWINGS

Exemplary embodiments of the present disclosure will be described in detail based on the following figures, wherein:

FIG. 4A is a side view illustrating schematic overall structure before activation of the vehicle occupant protection device in accordance with the exemplary embodiment.

FIG. 4B is a front view illustrating the schematic overall structure before activation of the vehicle occupant protection device in accordance with the exemplary embodiment.

FIG. 5 is a diagram illustrating a flat pattern of the multidirectional airbag structuring the vehicle occupant protection device in accordance with the exemplary embodiment.

FIG. 8A is a view illustrating a variant example of the multidirectional airbag in which hooks are disposed to be staggered.

FIG. 8B is a view illustrating a variant example of the multidirectional airbag in which a connecting cloth is provided.

DETAILED DESCRIPTION

Figure 1:
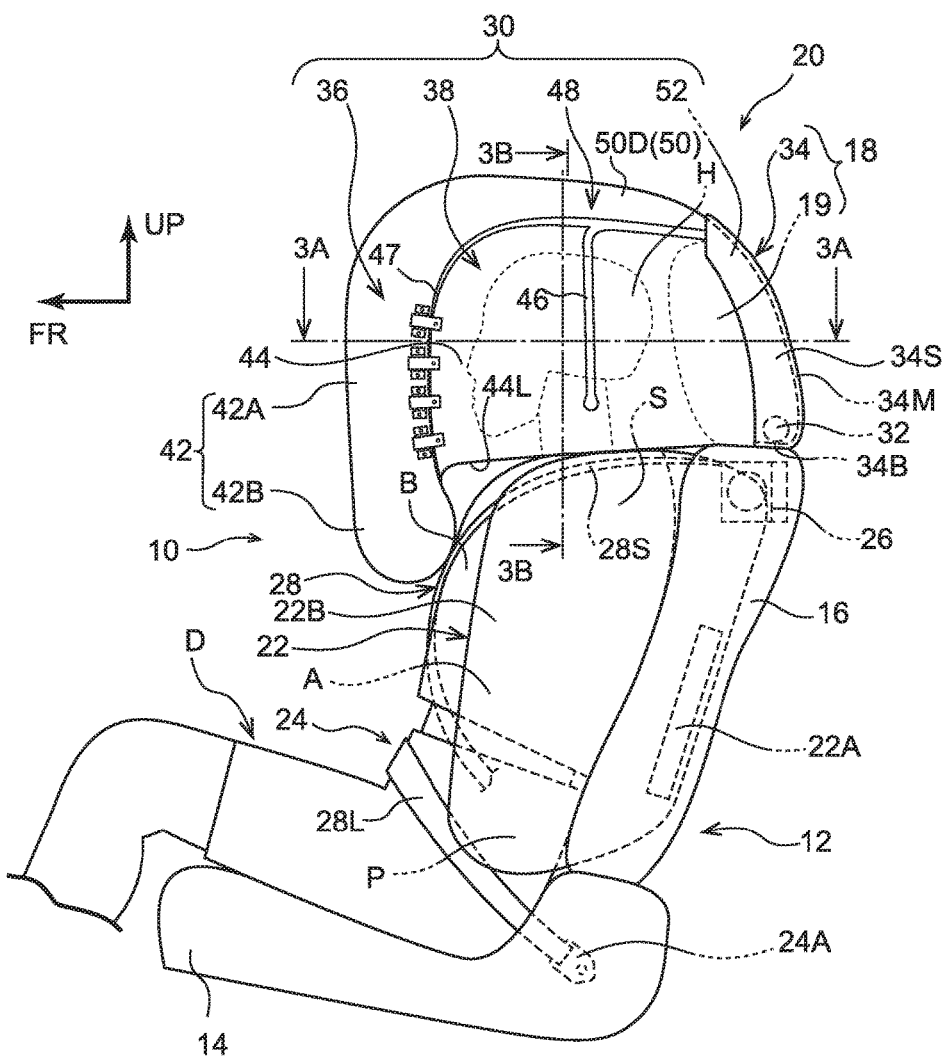
FIG. 1 is a side view schematically illustrating a seat occupant protection state of a vehicle occupant protection device in accordance with an exemplary embodiment.

A vehicle occupant protection device 10 according to an exemplary embodiment of the present disclosure is described with reference to the drawings. An arrow FR and an arrow UP that are marked in the drawings indicate a front direction (a direction in which a seat occupant faces) and an upper direction of a vehicle seat 12, respectively. Herebelow, where descriptions are given using the directions front, rear, up, down, left and right, unless particularly specified, these represent the front and rear in the seat front-rear direction, up and down in the seat vertical direction, and left and right in the seat left-right direction when facing forward. An arrow IN that is marked in the drawings indicates a vehicle middle side in the vehicle width direction of an automobile that is the vehicle in which the vehicle seat 12 is installed.

—Schematic Overall Structure of the Vehicle Occupant Protection Device—

Figure 2:
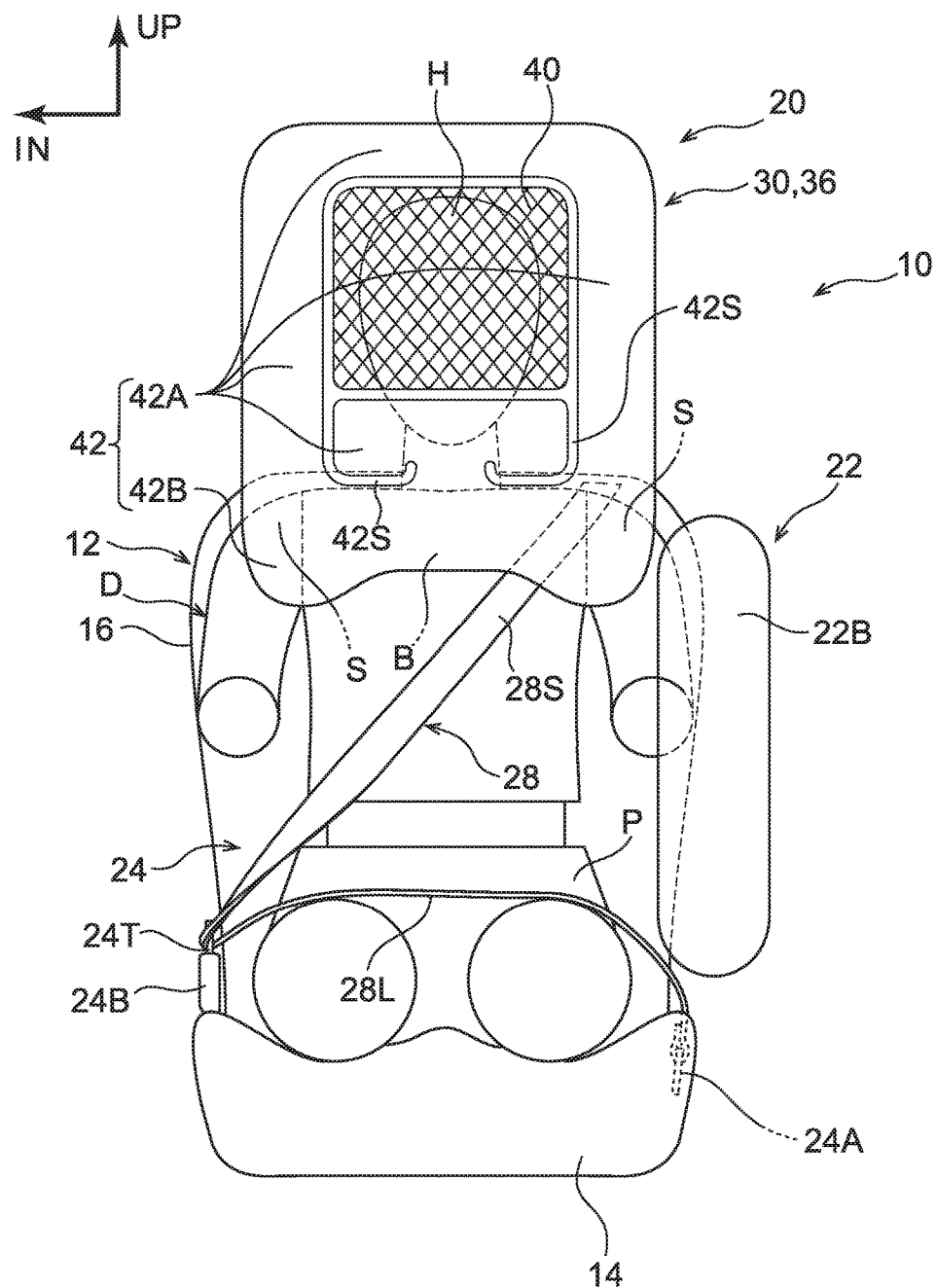
FIG. 2 is a front view schematically illustrating the seat occupant protection state of the vehicle occupant protection device in accordance with the exemplary embodiment.

As illustrated in FIG. 1 and FIG. 2, the vehicle occupant protection device 10 according to the present exemplary embodiment is installed in the vehicle seat 12. The vehicle seat 12 is disposed to be offset to left or right (to the left side in the present exemplary embodiment) relative to the middle in the vehicle width direction of the vehicle body of the automobile, which is not illustrated in the drawings. The seat front-rear direction of the vehicle seat 12 according to the present exemplary embodiment matches a front-rear direction of the vehicle, and a seat width direction of the vehicle seat 12 matches the vehicle width direction. The vehicle seat 12 includes a seat cushion 14, a seatback 16 of which a lower end is connected to a rear end of the seat cushion 14, and a headrest 18 that is provided at an upper end of the seatback 16.

The drawings illustrate a state in which a crash test dummy (a mannequin) that serves as a model of a vehicle occupant who is to be protected by the vehicle occupant protection device 10 is seated on the seat cushion 14 of the vehicle seat 12. The dummy D is, for example, a World Side Impact Dummy (WorldSID) AM50 dummy (representing the 50th percentile of American adult males). The dummy D is seated in a standard sitting attitude designated for impact testing, and the vehicle seat 12 is disposed at a standard specified position corresponding to the sitting attitude. Below, in order to facilitate understanding of the descriptions, the dummy D is referred to as "the seat occupant D".

The vehicle occupant protection device 10 includes a multidirectional airbag device 20 for protecting the seat occupant D from various modes of impact, a side airbag device 22, a seatbelt device 24, and an electronic control unit (ECU) 60 (see FIG. 4A) that serves as a control unit. Below, general structures of the seatbelt device 24 and the side airbag device 22 are described, and then the multidirectional airbag device 20 is described.

The seatbelt device 24 is a three-point seatbelt device: one end of a belt (a webbing) 28 is unwindably taken up onto a retractor 26 and another end of the belt 28 is fixed to an anchor 24A. A tongue plate 24T is slidably provided on the belt 28. The belt 28 is applied to the seat occupant D by this tongue plate 24T being engaged with a buckle 24B. The belt 28 includes a shoulder belt 28S that extends from the retractor 26 to the tongue plate 24T and restrains the upper body of the seat occupant D when the belt 28 is applied to the seat occupant D, and a lap belt 28L that extends from the tongue plate 24T to the anchor 24A and restrains a pelvis area P of the seat occupant D.

In the present exemplary embodiment, the seatbelt device 24 is configured as a seat-mounted seatbelt device, in which the retractor 26, the anchor 24A and the buckle 24B of the seatbelt device 24 are provided at the vehicle seat 12. The retractor 26 according to the present exemplary embodiment is equipped with a pre-tensioner serving as a belt take-up mechanism that forcibly applies tension to the belt 28 when activated. The pre-tensioner is activated by the ECU 60, which is described below.

The side airbag device 22 includes an inflator 22A and a side airbag 22B. The side airbag 22B is stowed in a folded state in a side portion at the vehicle width direction outer side of the seatback 16. The inflator 22A generates gas inside the side airbag 22B when activated. The side airbag 22B is inflated and expanded at the vehicle width direction outer side relative to the seat occupant D by this gas, protruding forward from the side portion of the seatback 16. In the present exemplary embodiment, the side airbag 22B is structured to inflate and expand at the vehicle width direction outer side relative to the pelvis area P, an abdomen area A, a breast area B and a shoulder area S of the seat occupant D.

—Structure of the Multidirectional Airbag Device—

As illustrated in FIG. 1, the multidirectional airbag device 20 includes a multidirectional airbag 30 that serves as an airbag, an inflator 32, and a module case 34 that structures the headrest 18. The multidirectional airbag 30 is folded in a state in which the same is connected such that gas is able to be supplied from the inflator 32, and the multidirectional airbag 30 is stowed inside the module case 34. This multidirectional airbag device 20 that is formed into a module is provided in the headrest 18 above the seatback 16.

—Multidirectional Airbag—

Figure 3A:
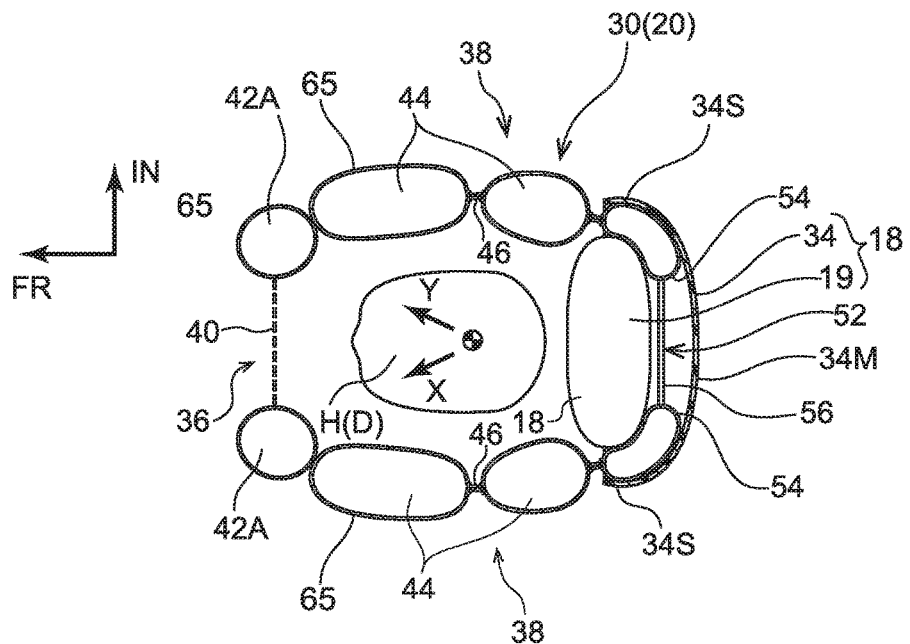
FIG. 3A is a sectional diagram, taken along line 3A-3A in FIG. 1, illustrating an inflated and expanded state of a multidirectional airbag that structures the vehicle occupant protection device in accordance with the exemplary embodiment.

As illustrated in the plan sectional view in FIG. 3A, the multidirectional airbag 30 is structured as a single bag that inflates and expands so as to cover the head area H (which may below be referred to simply as "the head H") of the seat occupant D from the front and both left and right sides. In more specific terms, as illustrated in FIG. 1 to FIG. 3B, the multidirectional airbag 30 includes a front expansion portion 36 that expands to the front relative to the head H and a pair of side expansion portions 38 that expand at both the left and right sides relative to the head H. In the present exemplary embodiment, a portion of the side expansion portions 38 serves as an opening portion 65 that is openable, which will be described below.

The front expansion portion 36 includes a mesh portion 40 and a front inflation portion 42. The mesh portion 40 is a view-enabling structure that expands at the front face of the head H. The front inflation portion 42 inflates and expands to surround the mesh portion 40 in a front view. The mesh portion 40 is formed in a substantially rectangular shape in front view. The front inflation portion 42 is formed in a substantially rectangular frame shape, inner periphery edges of which are joined to the mesh portion 40. The front inflation portion 42 receives a supply of gas and inflates and expands.

As illustrated in FIG. 2, regions of the front inflation portion 42 that are generally higher than the seatback 16 and surround the mesh portion 40 serve as a first inflation portion 42A that inflates and expands to forward of the head H. Regions of the front inflation portion 42 that are disposed below the first inflation portion 42A (i.e., that overlap with the seatback 16 in front view) serve as a second inflation portion 42B that inflates and expands forward of the breast area B and shoulder area S of the seat occupant D. The second inflation portion 42B is supplied with gas via the first inflation portion 42A. In the present exemplary embodiment, regions of the first inflation portion 42A that are disposed lower than the mesh portion 40 are partitioned from other regions of the first inflation portion 42A by seam portions 42S and are supplied with gas via the second inflation portion 42B.

As illustrated in FIG. 1, each side expansion portion 38 includes a side inflation portion 44 and a seam portion 46. The side inflation portion 44 receives a supply of gas and inflates and expands at the side of the head H. The seam portion 46 is a non-inflating portion that extends in the vertical direction and partitions the side inflation portion 44 into front and rear. The side inflation portion 44 has a size (area) that overlaps with the whole of the head H in side view. The seam portion 46 partitions the side inflation portion 44 into front and rear at a region of the side inflation portion 44 that overlaps with the head H.

—Opening Portion—

The seat front side of each side inflation portion 44 relative to the seam portion 46 serves as the opening portion 65 that is able to be opened from the front inflation portion 42 of the multidirectional airbag 30. The opening portions 65 are provided at locations that cover the head H of the seat occupant D from the seat sides relative to the pair of left and right side inflation portions 44. Each opening portion 65 is in fluid communication with the rear side of the side inflation portion 44 below the seam portion 46 such that gas is able to be supplied to the opening portion 65 from the rear side of the side inflation portion 44.

At a periphery edge portion of each opening portion 65, plural hooks 66 are provided to serve as opening hooks. At respective positions of the front inflation portion 42 corresponding with the hooks 66, engaging portions 68 are provided to serve as opening engaging portions. The hooks 66 are detachably engaged with the engaging portions 68. In the present exemplary embodiment, at each of the left and right opening portions 65, four of the hooks 66 are provided equidistantly, and four of the engaging portions 68 are provided equidistantly along the left or right first inflation portion 42A of the front inflation portion 42.

As illustrated in FIG. 1, the hooks 66 and engaging portions 68 of the present exemplary embodiment are provided at positions that are arranged along the seat vertical direction in the inflated and expanded state of the multidirectional airbag 30.

Figure 6:
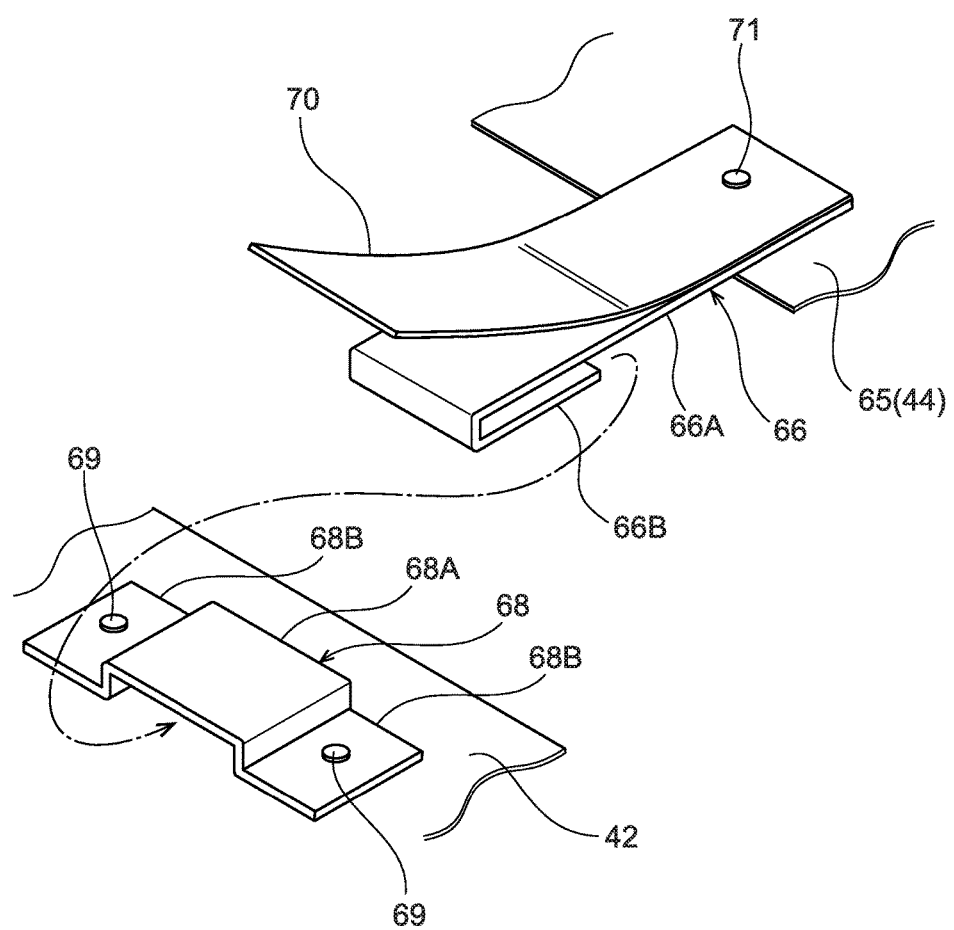
FIG. 6 is a magnified perspective view in which a hook and engaging portion in accordance with the exemplary embodiment are illustrated magnified.

As illustrated in FIG. 6, each hook 66 is formed in a substantial "J" shape in cross section, including a base portion 66A that extends from the opening portion 65 toward the side inflation portion 44 and a turnback portion 66B at which a distal end of the base portion 66A is formed to be turned back. The proximal side of the base portion 66A is fixed to the opening portion 65 by a fastening 71.

Each engaging portion 68 includes a main body 68A and a pair of flanges 68B that project from two end portions of the main body 68A. The main body 68A is formed in a flattened substantial "U" shape, opening to the side thereof at which the front inflation portion 42 is disposed. A gap into which the turnback portion 66B of the hook 66 may be inserted is provided between the main body 68A and the front inflation portion 42. The pair of flanges 68B are respectively fixed to the front inflation portion 42 by fastenings 69. The multidirectional airbag 30 is stowed in the headrest 18 in a state in which the hooks 66 are engaged with the engaging portions 68.

A strap 70 is attached to each hook 66. The strap 70 is a long, narrow cloth member that extends along the hook 66. A proximal side of the strap 70 is fixed to the opening portion 65, together with the hook 66, by the fastening 71. A distal end side of the strap 70 is a free end that may be moved away from the hook 66. In the state in which the hook 66 is engaged with the engaging portion 68, the hook 66 may be removed from the engaging portion 68 by the strap 70 being gripped and pulled in the direction in which the turnback portion 66B of the hook 66 disengages from the main body 68A. For convenience of depiction, the strap 70 is not illustrated in the drawings of FIG. 1, FIG. 5 and FIG. 7.

Figure 7:
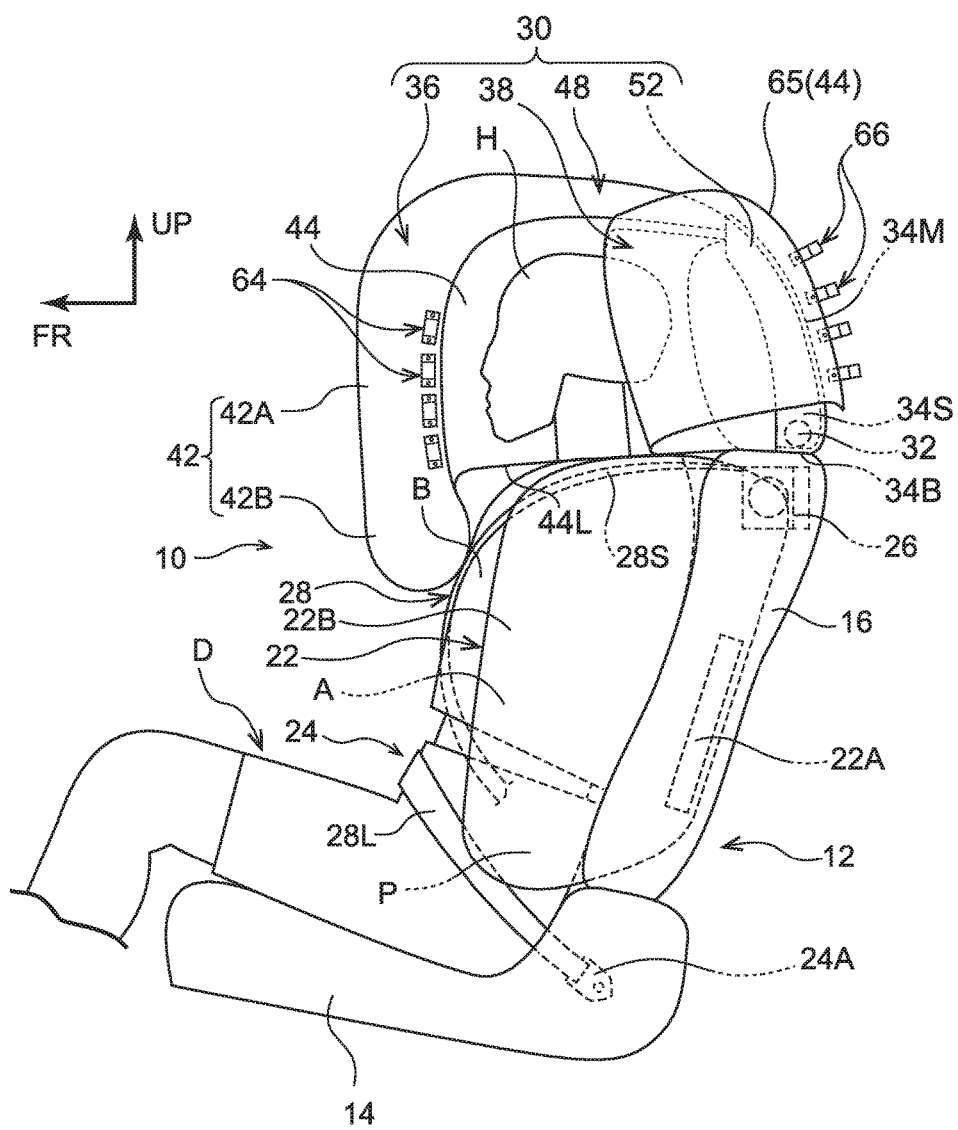
FIG. 7 is a side view, corresponding to FIG. 1, schematically illustrating a state in which an opening portion of the multidirectional airbag structuring the vehicle occupant protection device in accordance with the exemplary embodiment has been opened.

Because each opening portion 65 is provided at the side inflation portion 44 as described above, after the inflation and expansion of the multidirectional airbag 30, the opening portion 65 may be opened from the front inflation portion 42 by the hooks 66 being removed from the engaging portions 68. As illustrated in FIG. 7, the opened opening portion 65 is folded back (turned) toward the seat rear side. Thus, the head H of the seat occupant D is exposed in the seat width direction and the head H may be moved out to outside the multidirectional airbag 30. FIG. 7 depicts a state in which only the opening portion 65 disposed at the seat left side relative to the head H is open.

As illustrated in FIG. 1, the side expansion portions 38 are structured such that, in the inflated and expanded state of the multidirectional airbag 30, respective lower ends 44L of the side inflation portions 44 touch onto the shoulder area S of the seat occupant D. In this structure, a position in the vertical direction of the multidirectional airbag 30 in the inflated and expanded state relative to (the head H of) the seat occupant is determined by the lower ends 44L of the side inflation portions 44 touching against the shoulder area S.

In this positioned condition, none of the front expansion portion 36, the left and right side expansion portions 38 and an upper expansion portion 48 that is described below of the multidirectional airbag 30 touch against the head H of a seat occupant D who is sitting in a usual sitting attitude (i.e., gaps are formed between the multidirectional airbag 30 and the head H).

Figure 3B:
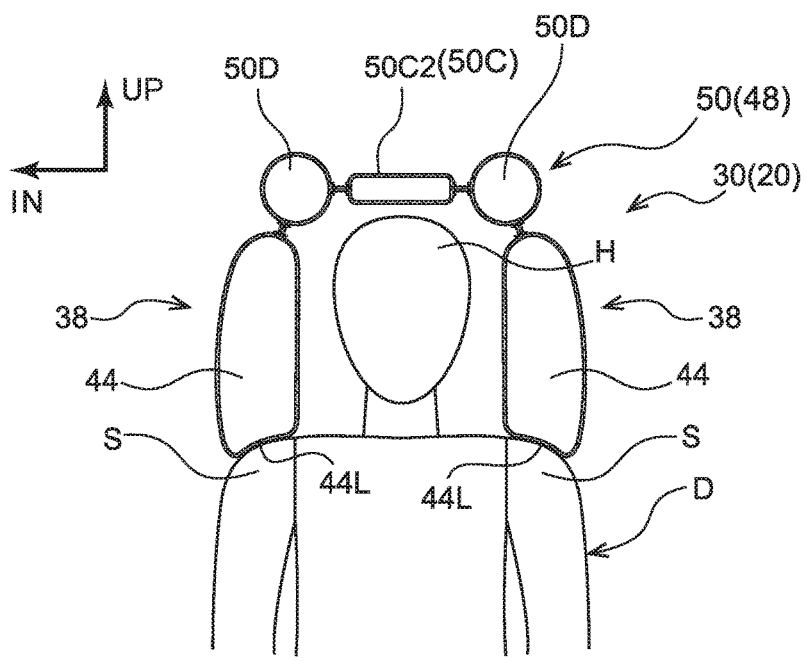
FIG. 3B is a sectional diagram, taken along line 3B-3B in FIG. 1, illustrating the inflated and expanded state of the multidirectional airbag that structures the vehicle occupant protection device in accordance with the exemplary embodiment.

The multidirectional airbag 30 includes the upper expansion portion 48, which is joined to upper edges of the front expansion portion 36 and the left and right side expansion portions 38 and expands above the head H of the seat occupant D. A principal portion structuring the upper expansion portion 48 is an upper inflation portion 50 that receives a supply of gas and inflates and expands. As illustrated in FIG. 3B, the upper inflation portion 50 includes a central inflation portion 50C and a pair of upper duct portions 50D. The central inflation portion 50C inflates and expands above the head H. The upper duct portions 50D are structured as duct portions that extend in the front-rear direction at the left and right of the central inflation portion 50C.

As illustrated by the flat pattern in FIG. 5, the central inflation portion 50C includes an inflation portion 50C1 and an inflation portion 50C2. The inflation portion 50C1 structures an upper edge of the front inflation portion 42. The inflation portion 50C2 is partitioned from the inflation portion 50C1 by a seam portion 50S1. The inflation portion 50C2 is partitioned into front and rear by a seam portion 50S2. Both left and right ends of the inflation portion 50C1 are in fluid communication with the upper duct portions 50D. A seat width direction central portion of a rear edge of the inflation portion 50C1 is in fluid communication with the inflation portion 50C2. Front ends of the left and right upper duct portions 50D are in fluid communication with each of left and right edges of the upper edge of the front inflation portion 42.

The multidirectional airbag 30 includes a rear expansion portion 52 that expands at the rear of the upper expansion portion 48. The rear expansion portion 52 includes rear duct portions 54, which are inflation portions, and a non-inflating portion 56. The rear duct portions 54 are divided between left and right and respective upper ends thereof are linked in fluid communication states with the corresponding left and right upper duct portions 50D. Front edges of the left and right rear duct portions 54 are joined to a rear edge of the central inflation portion 50C, and are connected with one another by the non-inflating portion 56. The rear duct portions 54 are linked in fluid communication states with the corresponding side inflation portions 44.

The left and right rear duct portions 54 form a flow junction with one another below the non-inflating portion 56 (see the right side of FIG. 5), forming a gas entry portion 54G. The gas entry portion 54G is connected to enable a supply of gas from the inflator 32 through a diffuser 55 that is formed in a "T" shape. The structure employing the diffuser 55 is not limiting; for example, a region of the inflator 32 that includes a gas jetting-out aperture may be inserted into the gas entry portion 54G. Further, the gas entry portion 54G may be curved in an "L" shape, and a region of the horizontal inflator 32 that includes a gas jetting-out aperture may be inserted into the gas entry portion 54G.

In a non-restraining inflated and expanded state of the multidirectional airbag 30 in which no seat occupant D is restrained as illustrated in FIG. 1, the multidirectional airbag 30 has a structure that does not coincide (overlap) in side view with the side airbag 22B in a non-restraining inflated and expanded state thereof in which no seat occupant D is restrained. In other words, the multidirectional airbag 30 and the side airbag 22B are structured so as not to include inflated and expanded portions that overlap with one another in the respective non-restraining inflated and expanded states thereof, at least in side view. Moreover, as illustrated in FIG. 2, the multidirectional airbag 30 in the non-restraining inflated and expanded state does not coincide in front view with the side airbag 22B in the non-restraining inflated and expanded state in which no seat occupant D is restrained.

Before being folded, the multidirectional airbag 30 that inflates and expands as described above is formed in an expanded shape (a flat pattern). The multidirectional airbag 30 with this expanded shape is formed as a single bag by an OPW technique (one-piece woven). The multidirectional airbag 30 may also be formed as a single bag by a technique in which periphery edges of two fabrics are sewn together (cut and sew).

—Inflator—

The inflator 32 that is employed is an ignition-type or cold gas-type inflator. When activated, the inflator 32 supplies generated gas into the multidirectional airbag 30. In the present exemplary embodiment, the inflator 32 is formed as a cylinder-shaped inflator. The inflator 32 is stowed in an upper portion of the seatback 16 and is fixed to a seatback frame that is not illustrated in the drawings. The inflator 32 is disposed with a length direction thereof in the seat width direction. Activation of the inflator 32 is controlled by the ECU 60, which is described below.

—Module Case—

As illustrated in FIG. 1, the headrest 18 includes a headrest main body 19 and the module case 34, which is disposed at the seat rear side of the headrest main body 19. The headrest main body 19 structures a front portion of the headrest 18 and is disposed at the seat rear side of the head H of a seat occupant D. The headrest main body 19 is mounted at the seatback 16 via headrest stays.

The module case 34 disposed at the seat rear side of the headrest main body 19 is formed as a backboard that structures (a rear design part of) the headrest 18. Thus, the multidirectional airbag 30 may be stowed in a rear portion of the headrest 18.

As illustrated in FIG. 4B, in front view the module case 34 protrudes further upward than an upper end of the headrest main body 19 and projects further to both sides in the seat width direction than the headrest main body 19. In other words, the module case 34 covers the headrest main body 19 from the rear thereof. In the present exemplary embodiment, the module case 34 covers the rear portion of the headrest main body 19 from above and both left and right sides. Thus, as mentioned above, the module case 34 structures the rear design part of the headrest 18.

More specifically, as illustrated in FIG. 1, the module case 34 is a structure whose principal portions are a base portion 34B, a main wall 34M, and a pair of left and right side walls 34S The base portion 34B touches the upper end of the seatback 16.

The main wall 34M protrudes upward from a rear end of the base portion 34B, is angled forward such that an upper end of the main wall 34M is disposed to forward relative to a lower end, and is formed in a curved shape that protrudes to the upper-rear side in side view. In front view, the main wall 34M protrudes further upward than the upper end of the headrest main body 19 and projects further to both sides in the seat width direction than the headrest main body 19.

A gap in which the multidirectional airbag 30 in the folded state is stowed is formed between the main wall 34M and the headrest main body 19. The upper end of the main wall 34M reaches over the headrest 18. In this structure, in the process of inflation and expansion, the multidirectional airbag 30 passes through between the upper end portion of the main wall 34M and the headrest main body 19. In the inflated and expanded state, the rear expansion portion 52 of the multidirectional airbag 30 passes between the upper end portion of the main wall 34M and the headrest main body 19.

The pair of side walls 34S protrude forward from two seat width direction ends of the main wall 34M, covering a rear portion of the headrest main body 19 in side view. As illustrated in FIG. 3A, in the inflated and expanded state, (regions close to boundaries with the rear expansion portion 52 of) the side expansion portions 38 of the multidirectional airbag 30 pass through gaps between the pair of side walls 34S and the headrest main body 19.

The multidirectional airbag 30 in the folded state is stowed between the module case 34 described above and the headrest main body 19. The inflator 32, together with the multidirectional airbag 30 and the base portion 34B of the module case 34, is fastened to the seatback frame by stud bolts.

The multidirectional airbag 30 is outside roll-folded and stowed in the module case 34. The term "outside roll folding" refers to a mode of folding into a roll from the front end side toward the upper side and the rear side, so as to fold the opposite way to the expansion process. That is, outside roll folding is a folding mode in which a rolled portion is disposed at the outer side of the multidirectional airbag 30 during the expansion process of the multidirectional airbag 30 (i.e., at the opposite side of the multidirectional airbag 30 from the head H). The multidirectional airbag 30 in which the side expansion portions 38 are sewn to the upper expansion portion 48 and the rear expansion portion 52 as described above is folded with the side expansion portions 38 inside the roll at the stage at which the front expansion portion 36 and upper expansion portion 48 are being outside roll-folded.

As illustrated in FIG. 4B, the gap between the module case 34 and the headrest main body 19 is closed off by an airbag door 35. The airbag door 35 is ruptured by expansion pressure of the multidirectional airbag 30, starting at a tear line 35T that is a weakened portion. This structure allows inflation and expansion of the multidirectional airbag 30 to the front.

—Configuration of ECU—

As illustrated in FIG. 4A, the multidirectional airbag device 20, side airbag device 22 and seatbelt device 24 structuring the vehicle occupant protection device 10 are controlled by the ECU 60 serving as a control device. Specifically, the ECU 60 is electronically connected to the inflator 32 of the multidirectional airbag device 20, the inflator 22A of the side airbag device 22, and the retractor 26 of the seatbelt device 24. The ECU 60 is also electronically connected to a collision prediction sensor 62, such as a pre-crash sensor or the like, and a collision sensor 64 (or sensor group).

On the basis of signals from the collision prediction sensor 62, the ECU 60 may predict (an occurrence of or unavoidability of) various modes of frontal collision against the automobile in which the ECU 60 is employed, for each of collision modes that are described below. The ECU 60 may also predict, on the basis of signals from the collision prediction sensor 62, (an occurrence of or unavoidability of) a side collision against the automobile in which the ECU 60 is employed.

When the ECU 60 predicts a frontal collision on the basis of signals from the collision prediction sensor 62 or detects a frontal collision on the basis of signals from the collision sensor 64, the ECU 60 both activates the pretensioner and activates the inflator 32. When the pretensioner is activated, tension is applied to the belt 28 and the seat occupant D is restrained at the seatback 16. When the inflator 32 is activated, the multidirectional airbag 30 inflates and expands to the seat front. Modes of frontal collision in which the ECU 60 activates the inflator 32 include a full overlap frontal collision and an offset frontal collision.

When the ECU 60 predicts, on the basis of signals from the collision prediction sensor 62, or detects, on the basis of signals from the collision sensor 64, a frontal collision that is a frontal collision against a position that is offset by more than a predetermined amount to one side in the vehicle width direction, the ECU 60 both activates the pretensioner and activates the inflator 22A and the inflator 32. When the pretensioner is activated, tension is applied to the belt 28 and the seat occupant D is restrained at the seatback 16. When the inflator 22A and the inflator 32 are activated, the side airbag 22B inflates and expands to the seat width direction outer side relative to the seat occupant D and the multidirectional airbag 30 inflates and expands to the seat front. Frontal collisions against positions that are offset by at least a predetermined amount to one side in the vehicle width direction include oblique collisions, small overlap collisions and the like.

Here, the meaning of the term "oblique collision" (an moving deformable barrier (MDB) impact or an oblique impact) includes, for example, a diagonal collision from the front as defined by the National Highway Traffic Safety Administration (NHTSA) (for example, a collision at a relative angle of 15° with the other party of the collision and an overlap amount of around 35% in the vehicle width direction). In the present exemplary embodiment, the relative speed of an oblique collision is assumed to be, as an example, 90 km/h. The meaning of the term "small overlap collision" includes a frontal collision of an automobile that is, for example, a collision defined by the Insurance Institute for Highway Safety (IIHS) in which an overlap amount in the vehicle width direction with the other party of the collision is no more than 25%. For example, an impact against the vehicle width direction outer side relative to a front side member, which is a vehicle framework member, corresponds to the term "small overlap collision". In the present exemplary embodiment, the relative speed of a small overlap collision is assumed to be, as an example, 64 km/h.

—Operation and Effects—

Now, operation of the present exemplary embodiment is described.

In the vehicle occupant protection device 10 according to the present exemplary embodiment, the multidirectional airbag 30 is structured as a single bag that expands into a region including the front of the head H of a seat occupant D and a region including both left and right sides thereof, and covers the head H of the seat occupant D. Hence, because the head H of the seat occupant D is covered by the multidirectional airbag 30 when there is a collision of the vehicle, the head H of the seat occupant D may be restrained against and protected from a variety of collision modes.

The opening portions 65 are provided at the side inflation portions 44 of the multidirectional airbag 30. Each opening portion 65 is made openable from the front inflation portion 42 by the hooks 66 being removed from the engaging portions 68 after the inflation and expansion of the multidirectional airbag 30. Therefore, for example, when a collision of the vehicle has been predicted or detected, the multidirectional airbag 30 has inflated and expanded, and subsequently safety has been confirmed, the seat occupant D removes the hooks 66 from the engaging portions 68 and opens up the opening portion 65. Then, as illustrated in FIG. 7, the seat occupant may turn back (fold) one of the opening portions 65 toward the seat rear side and may move their head H out of the multidirectional airbag 30.

As described above, the seat occupant D may easily move their head H out to outside the multidirectional airbag 30 without lifting up the multidirectional airbag 30 or rubbing their head H against the lower side of the multidirectional airbag 30. Thus, ease of dismounting for the seat occupant D may be assured even after the multidirectional airbag 30 has inflated and expanded. When a rescuer is taking the seat occupant D off the vehicle seat 12, the rescuer may easily move the head H of the seat occupant D out of the multidirectional airbag 30 by removing the hooks 66 from the engaging portions 68 and opening up the opening portion 65.

In the present exemplary embodiment, a structure is formed such that the opening portion 65 may be opened by a simple structure in which the hooks 66 are just removed from the engaging portions 68. Therefore, a rescuer may understand how to open the opening portion 65 from the multidirectional airbag 30 at a glance. Thus, the opening portion 65 may be opened without particular knowledge being required and ease of dismounting of the seat occupant D may be assured.

The opening portion 65 may be made openable using fasteners, buttons or the like. However, in this case it is necessary to take measures to withstand tensions that act on the fasteners or buttons during the inflation and expansion of the multidirectional airbag 30. In contrast, in the present exemplary embodiment it is sufficient that the fastening 71 fixing each hook 66 and the fastenings 69 fixing each engaging portion 68 may withstand forces that act during the inflation and expansion of the multidirectional airbag 30. Therefore, no special measures are needed. During the inflation and expansion of the multidirectional airbag 30, the hooks 66 and engaging portions 68 are pulled in directions away from one another (in the seat front-rear direction). Therefore, the state in which the hooks 66 are engaged with the engaging portions 68 is maintained. Thus, unintended opening of the opening portion 65 during the inflation and expansion of the multidirectional airbag 30 may be effectively suppressed.

In the present exemplary embodiment, the straps 70 are attached to the hooks 66. Therefore, the hooks 66 may be removed from the engaging portions 68 more easily than in a structure in which the hooks 66 themselves are gripped and removed from the engaging portions 68. Thus, efficiency when the opening portion 65 is being opened may be improved.

The multidirectional airbag 30 according to the present exemplary embodiment is stowed in the module case 34 structuring the headrest 18. Therefore, appearance prior to activation is excellent even though the vehicle occupant protection performance is at least equivalent to a structure in which, for example, a gas supply pipe disposed so as to go around above the head of a vehicle occupant protrudes into the vehicle cabin at usual times. Moreover, the vehicle occupant protection device 10 (principally the multidirectional airbag device 20) does not impede front-rear position adjustment, height adjustment, reclining operations and the like of the vehicle seat 12.

In the multidirectional airbag device 20 that structures the vehicle occupant protection device 10, the position of the multidirectional airbag 30 in the vertical direction relative to a seat occupant D is determined by the lower ends 44L of the side inflation portions 44 that structure the side expansion portions 38 of the multidirectional airbag 30 touching onto the shoulder area S of the seat occupant D. Therefore, the multidirectional airbag 30 may inflate and expand at an appropriate position in the vertical direction regardless of, for example, individual differences in build, sitting position and the like of seat occupants D. Thus, restraint (movement restricting) performance of the multidirectional airbag 30 is improved.

An exemplary embodiment of the present disclosure has been described hereabove but the present disclosure is not limited by the structure described above and it will be clear that the present disclosure may be embodied in numerous modes beside the above structure within a scope that does not depart from the gist of the present disclosure. For example, in the exemplary embodiment described above, the hooks 66 and engaging portions 68 are arranged along a vertical direction as illustrated in FIG. 1, but this is not limiting. The hooks 66 and engaging portions 68 may be disposed as in a first variant example illustrated in FIG. 8A.

First Variant Example

As illustrated in FIG. 8A, a multidirectional airbag 72 according to the present variant example includes the front expansion portion 36, the side expansion portions 38, the upper expansion portion 48 and the rear expansion portion 52, similarly to the exemplary embodiment described above. In this variant example, the seat front side of the side inflation portion 44 of each side expansion portion 38 relative to the seam portion 46 serves as an opening portion 73 that may be opened from the front inflation portion 42 of the multidirectional airbag 72.

The opening portions 73 are provided at locations that cover the head H of a seat occupant D from the seat sides relative to the pair of left and right side inflation portions 44. A front end portion of each opening portion 73 (side inflation portion 44) is formed in a zigzag shape viewed from the seat width direction. Specifically, indented portions that are indented to the seat rear side and protruding portions that form protrusions to the seat front side are formed alternately along the seat vertical direction. The hooks 66 are formed at each of the indented portions and the protruding portions. That is, the hooks 66 are disposed to be staggered in the seat front-rear direction.

The engaging portions 68 with which the hooks 66 are detachably engaged are provided at respective positions of the front inflation portion 42 that correspond with the hooks 66. The engaging portions 68 are disposed to be staggered in the seat front-rear direction in the same manner as the hooks 66.

The multidirectional airbag 72 is stowed in the headrest 18 in the outside roll-folded state together with the opening portions 73. Because the hooks 66 are disposed at staggered positions in the seat front-rear direction, neighboring the hooks 66 do not overlap with one another in the folded state of the opening portions 73. Similarly, because the engaging portions 68 are disposed at staggered positions in the seat front-rear direction, neighboring the engaging portions 68 do not overlap with one another in the folded state of the front inflation portion 42.

According to the present variant example, because the neighboring hooks 66 do not overlap with one another in the state in which the opening portions 73 are folded, and the neighboring engaging portions 68 do not overlap with one another, the multidirectional airbag 72 may be stowed compactly. Moreover, during inflation and expansion of the opening portions 73, an occurrence of the hooks 66 interfering with one another or the engaging portions 68 interfering with one another and impeding the expansion of the multidirectional airbag 72 may be suppressed. Thus, the multidirectional airbag 72 may be stowed compactly and expansion performance of the opening portions 73 may be made reliable.

Second Variant Example

A structure is possible in which a connecting cloth 82 is provided as in the second variant example illustrated in FIG. 8B.

As illustrated in FIG. 8B, in the present variant example the connecting cloth 82 is provided, which connects up the multidirectional airbag 30 in the seat front-rear direction in the inflated and expanded state. The connecting cloth 82 is a long, narrow, belt-shaped member that extends in the seat front-rear direction. A rear end portion of the connecting cloth 82 is fixed to the rear expansion portion 52 or the interior of the module case 34. A front end portion of the connecting cloth 82 extends diagonally toward the seat front side and seat lower side from the rear end portion and is connected to the front inflation portion 42.

A hook 84 that serves as a connection release hook is provided at the front end portion of the connecting cloth 82.

An engaging portion 86 that serves as a connection release engaging portion, with which the hook 84 is detachably engaged, is provided at a position of the front inflation portion 42 that corresponds with the hook 84.

The hook 84 has a similar structure to the hook 66 according to the exemplary embodiment, which is illustrated in FIG. 6, and the engaging portion 86 has a similar structure to the engaging portion 68 according to the exemplary embodiment. Therefore, a connecting state of the connecting cloth 82 may be released by removing the hook 84 from the engaging portion 86.

According to the present variant example, because the multidirectional airbag 30 is connected up in the seat front-rear direction by the connecting cloth 82, spreading of the multidirectional airbag 30 in the seat front-rear direction during the inflation and expansion is suppressed, and the expanded attitude of the multidirectional airbag 30 may be excellently maintained. Because the connecting state by the connecting cloth 82 may be released by removing the hook 84 from the engaging portion 86, the opening portion 65 may be opened more easily than in a structure in which the connecting cloth 82 is non-detachably connected. Thus, the opening portion 65 may be opened and ease of dismounting of a seat occupant D may be assured even though the expanded attitude of the multidirectional airbag 30 is excellently maintained.

In the present variant example, the hook 84 and engaging portion 86 are provided only at the front end portion of the connecting cloth 82, but this is not limiting. The hook 84 and engaging portion 86 may be provided at both end portions of the connecting cloth 82. For example, a structure is possible in which the rear end portion of the connecting cloth 82 is connected to a rear portion of the side inflation portion 44 by the hook 84 and engaging portion 86 and the front end portion of the connecting cloth 82 is connected to the front inflation portion 42 by others of the hook 84 and engaging portion 86. In this structure, the connecting state may be released by the hook 84 being removed from the engaging portion 86 at either of the front end portion and the rear end portion of the connecting cloth 82. Because the connecting cloth 82 may be detached from the multidirectional airbag 30 by the hook 84 being removed from the engaging portion 86 at either of the two end portions of the connecting cloth 82, the opening portion 65 may be opened more easily.

In the present exemplary embodiment and variant examples described above, a chamber from which gas does not escape or from which little gas escapes may be provided at a portion of the multidirectional airbag. For example, in the flat pattern of FIG. 5, regions from the first inflation portion 42A at each of the two width direction sides of the mesh portion 40 to each upper duct portion 50D may be specified as being chambers from which little gas escapes. With this structure, a gap between the head H of a seat occupant D and the multidirectional airbag 30 may be assured even after the inflation and expansion of the multidirectional airbag 30, making opening of the opening portions 65 easier.

In the present exemplary embodiment and variant examples described above, as illustrated in FIG. 6, the strap 70 is attached to each hook 66, the strap 70 is gripped and the opening portion 65 is turned back (folded) toward the seat rear side, but this is not limiting. For example, a structure is possible in which the straps 70 are not attached. A further structure is possible in which a large handle is attached to the opening portion 65 in FIG. 1 by the straps 70, this handle is gripped, and the opening portion 65 is turned back (folded).

A structure is possible in which the procedure for opening the opening portion 65 is described by a voice message at a time of inflation and expansion of the multidirectional airbag. The procedure for opening the opening portion 65 may also be illustrated using a monitor or the like provided at an instrument panel of the vehicle. Thus, the opening portion 65 may be opened in accordance with the described procedure rather than the seat occupant D being confused after the inflation and expansion of the multidirectional airbag.

In the present exemplary embodiment and variant examples described above, the seat front side of each side inflation portion 44 relative to the seam portion 46 serves as the opening portion 65, but this is not limiting. For example, the front inflation portion 42 may serve as the opening portion. In this case, the hooks 66 are removed from the engaging portions 68 and then the front inflation portion 42 is turned back (folded) toward the seat upper side. Thus, the head H of a seat occupant D is exposed to the seat front thereof and the head H may be moved out to outside the multidirectional airbag 30. The positions of the hooks 66 and the engaging portions 68 may also be altered. For example, a structure is possible in which the side inflation portion 44 is divided into front and rear at the position of the seam portion 46, the hooks are provided at one part of the side inflation portion 44 and the engaging portions are provided at the other part of the side inflation portion 44. In this structure, gas may be supplied through the front inflation portion 42 to the opening portion 65 by a front portion of the opening portion 65 being in fluid communication with the front inflation portion 42. The head H of a seat occupant D may be exposed in the seat width direction by the hooks being removed from the engaging portions and the opening portion 65 being turned back (folded) toward the seat front side.

In the present exemplary embodiment and variant examples described above, the hooks 66 and engaging portions 68 are provided at the outer side of the multidirectional airbag, but this is not limiting. For example, the hooks and engaging portions may be provided at the inner side of the multidirectional airbag. In this structure, a seat occupant D may open the opening portion by putting their hand inside the multidirectional airbag and removing the hooks from the engaging portions. In this structure it is preferable if the hooks and engaging portions are provided at positions that do not come into direct contact with the head H of the seat occupant D. The hooks and engaging portions may be provided at both the outer side and the inner side of the multidirectional airbag 30.

In the present exemplary embodiment and variant examples described above, examples are illustrated in which the multidirectional airbag is stowed in the headrest 18, but this is not limiting. A structure is possible in which a multidirectional airbag is stowed inside a vehicle seat in which the headrest 18 and the seatback 16 are integrated. In this structure, a region of the vehicle seat that supports the head area of a seat occupant corresponds to the "headrest" of the present disclosure, and a region of the vehicle seat that supports the back area of a seat occupant corresponds to the "seatback" of the present disclosure. A structure is possible in which the multidirectional airbag extends across a region of a vehicle seat that supports the head area of a vehicle occupant and a region that supports the back area of the vehicle occupant.

In the exemplary embodiment and variant examples described above, examples are illustrated in which the vehicle occupant protection device is equipped with the side airbag device 22, but the present disclosure is not limited thus. For example, the vehicle occupant protection device may be a structure that is not equipped with the side airbag device 22. Moreover, structures in which the vehicle occupant protection device is equipped with the side airbag device 22 are not limited to the structure in which the side airbag device 22 is provided at the vehicle seat 12. For example, the vehicle occupant protection device may be a structure that is equipped with a side airbag device provided at a side door or the like. Further, an example is illustrated in which the vehicle occupant protection device is equipped with the side airbag device 22 at the vehicle width direction outer side, but the present disclosure is not limited thus. For example, the vehicle occupant protection device may be a structure that is equipped with a side airbag device disposed at the vehicle width direction middle side instead of or in addition to the side airbag device 22 at the vehicle width direction outer side.

In the exemplary embodiment and variant examples described above, an example is illustrated in which the front expansion portion structuring the multidirectional airbag 30 includes the mesh portion 40, but the present disclosure is not limited thus. For example, a structure is possible in which a transparent sheet is provided instead of the mesh portion 40 to serve as a view-enabling structure, and structures that do not include a view-enabling structure are possible.

In the exemplary embodiment and variant examples described above, examples are illustrated in which the multidirectional airbag is outside roll-folded, but the present disclosure is not limited thus. For example, the multidirectional airbag may be stowed in the headrest 18 or the seatback 16 in an alternative folding mode such as bellows folding or the like.

What is claimed is:

1. A vehicle occupant protection device comprising:
   an airbag structured as a single bag that is configured to cover a head area of a vehicle occupant, the airbag being stowed at a headrest or seatback of a vehicle seat, the airbag receiving a gas supply and inflating and expanding toward a seat front side, and the airbag including
      a front inflation portion that is configured to be inflated at the seat front relative to the head area, and
      a left and right pair of side inflation portions that are connected to the front inflation portion and configured to be inflated at seat sides relative to the head area; and
   an opening portion that is provided at the airbag, is configured to cover the head area from the seat front side or a seat side, and is openable after the inflation and expansion of the airbag, wherein
   the opening portion includes a plurality of opening hooks at a periphery edge portion thereof, and
   the airbag includes opening engaging portions with which the plurality of opening hooks are respectively detachably engaged.

2. The vehicle occupant protection device according to claim 1, wherein
   the airbag is stowed in the headrest or the seatback together with the opening portion in a folded state, and
   the plurality of opening hooks are disposed to be staggered such that neighboring the opening hooks do not overlap in the state in which the opening portion is folded.

3. The vehicle occupant protection device according to claim 1, wherein each of the plurality of opening hooks includes a grippable strap.

4. A vehicle occupant protection device comprising:
an airbag structured as a single bag that is configured to cover a head area of a vehicle occupant, the airbag being stowed at a headrest or seatback of a vehicle seat, the airbag receiving a gas supply and inflating and expanding toward a seat front side, and the airbag including
  a front inflation portion that is configured to be inflated at the seat front relative to the head area, and
  a left and right pair of side inflation portions that are connected to the front inflation portion and configured to be inflated at seat sides relative to the head area;
an opening portion that is provided at the airbag, is configured to cover the head area from the seat front side or a seat side, and is openable after the inflation and expansion of the airbag; and
a connecting cloth that extends in a seat front-rear direction and connects up the airbag in the seat front-rear direction in the inflated and expanded state, the connecting cloth including a connection release hook, at least one of one end portion, and another end portion of the connecting cloth,
wherein the airbag includes a connection release engaging portion with which the connection release hook detachably engages.

* * * * *